United States Patent
Yamashita et al.

(10) Patent No.: US 7,201,510 B2
(45) Date of Patent: Apr. 10, 2007

(54) EDGE LIGHTED DEVICE WITH POLARIZATION

(75) Inventors: Tomoyoshi Yamashita, Kanagawa (JP); Yasuko Hayashi, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 3 days.

(21) Appl. No.: 10/523,801

(22) PCT Filed: Aug. 8, 2003

(86) PCT No.: PCT/JP03/10157

§ 371 (c)(1),
(2), (4) Date: Feb. 9, 2005

(87) PCT Pub. No.: WO2004/015330

PCT Pub. Date: Feb. 19, 2004

(65) Prior Publication Data

US 2005/0248960 A1  Nov. 10, 2005

(30) Foreign Application Priority Data

Aug. 9, 2002 (JP) .............................. 2002-232387

(51) Int. Cl.
*G02F 1/1335* (2006.01)
*F21V 7/04* (2006.01)

(52) U.S. Cl. .................. 362/617; 362/19; 362/600; 362/620; 362/626; 349/65

(58) Field of Classification Search .................. 362/19, 362/606, 607, 620, 600, 617, 626; 349/65
See application file for complete search history.

(56) References Cited

U.S. PATENT DOCUMENTS 6,079,841 A * 6/2000 Suzuki ...................... 362/616
2003/0063234 A1 * 4/2003 Oda et al. ..................... 349/65

FOREIGN PATENT DOCUMENTS

| JP | 9-146092 | 6/1997 |
|---|---|---|
| JP | 9-297222 | 11/1997 |
| JP | 2001-143515 | 5/2001 |
| JP | 2002-124112 | 4/2002 |
| JP | 2002-197908 | 7/2002 |
| WO | WO 95/17699 | 6/1995 |
| WO | WO 98/40664 | 9/1998 |

* cited by examiner

*Primary Examiner*—Sandra O'Shea
*Assistant Examiner*—James W Cranson, Jr.
(74) *Attorney, Agent, or Firm*—Morgan, Lewis & Bockius LLP

(57) ABSTRACT

A planar light source device includes a primary light source (1), a light guide (3) which leads the light emitted from the primary light source (1), and having a light incident face (31) to which the light emitted from the primary light source (1) comes in, and a light emitting face from which the led light goes out, a light deflection element (4) arranged adjacent to the light emitting face (33) of the light guide (3), and a polarization separation element (6) disposed on the side of a light outgoing surface (42) of the light deflection element (4), and having a function of transmitting one of polarization components of the incident light and reflecting the other of the polarization components. The full width at half maximum of the luminance distribution of the incident light upon the polarization separation element (6) in an XY plane parallel to the travel direction of the light in the light guide (3) is 25° or less. The reference symbol 7 indicates a liquid crystal display element.

22 Claims, 5 Drawing Sheets

EDGE LIGHTED DEVICE WITH POLARIZATION

TECHNICAL FIELD

The present invention relates to an edge light system planar light source device constituting a liquid crystal display device or the like for use as a display unit in a notebook-size personal computer, liquid crystal television, cellular phone, portable information terminal (personal digital assistants [PDA]) or the like, particularly to improvement of a planar light source device using a polarization separation element.

BACKGROUND ART

In recent years, color liquid crystal display devices have been broadly used as monitors for portable notebook-size personal computers, personal computers and the like, or as display units for liquid crystal television sets, video integrated liquid crystal television sets, cellular phones, portable information terminals and the like in various fields. With an increase of an information processing amount, diversification of needs, adaptation to multimedia and the like, enlargement of a screen, and enhancement of definition of the liquid crystal display device have been vigorously advanced.

The liquid crystal display device basically comprises a backlight unit and a liquid crystal display element unit. As the backlight unit, there is an under light system in which a light source is disposed right under the liquid crystal display element unit or an edge light system in which a light source is disposed facing a side face of a light guide. From a viewpoint of a compact liquid crystal display device, the edge light system has been frequently used.

Additionally, since a polarization direction of light emitted from the backlight unit has heretofore been uneven, about half of the light has Seen absorbed and wasted by a polarization plate disposed on an incidence side of the liquid crystal display unit.

As a solution of this problem, as described in JP(A)-9-506984, a method is used in which a polarization separation element having a function of transmitting one polarization component of the light and reflecting the other polarization component is disposed on an emitting face of the backlight unit. A polarization transmission direction of the polarization plate disposed on the incidence side of the liquid crystal display element is matched with that of the polarization separation element. Accordingly, the polarization component which has heretofore been absorbed by the polarization plate and wasted is reflected by the polarization separation element, and returned to the backlight unit. The light returned to the backlight unit is reflected by the back surface of the light guide or the like, and strikes on the polarization separation element again. The light returned to the backlight unit changes its polarized state while reflection is repeated in the light guide. A part of the light which has entered the polarization separation element passes through the polarization separation element, and the other light is reflected again. In this manner, if there is not any loss of quantity of light while the light reciprocates between the polarization separation element and the backlight unit, all the light eventually passes through the polarization separation element. There list not be any light that has heretofore been absorbed by the polarization plate of the liquid crystal display element unit.

However, in actuality, since there occurs a loss of quantity of light every time the light reflected by the polarization separation element is reflected by the backlight unit, luminance is not enhanced according to the theory. Then, in order to enhance a ratio at which the light reflected by the backlight unit strikes on the polarization separation element again, it has been proposed in JP(A)-11-352479 that a regular reflection sheet be used on the back surface of the light guide. To further enlarge a change of the polarized state by the reflection in the backlight unit, it has been described in JP(A)-11-142849 that elongated prisms be disposed on the back surface of the light guide, and formed in such a manner as to extend in an oblique direction with respect to a polarization transmission plane of the polarization separation element.

However, even if these methods are used, the loss by the reflection between the polarization separation element and the backlight unit cannot be sufficiently reduced, and an effect of enhancing the luminance by the use of the polarization separation element is not sufficient.

DISCLOSURE OF THE INVENTION

Therefore, an object of the present invention is to provide a planar light source device which enhances a polarization separation ability of a polarization separation element and whose luminance is remarkably high.

In view of the above-described problems of the conventional techniques, the present inventors have found that light entering a polarization separation element is concentrated on a normal-line direction of the polarization separation element, so that transmittance with respect to polarized light in a transmission axis direction of the polarization separation element can be enhanced, and a polarization separation ability of the polarization separation element can be enhanced, and thus the present inventors have reached the present invention.

That is, according to the present invention, there is provided a planar light source device comprising: a primary light source; a light guide leading light emitted from the primary light source, and having a light incident face to which the light emitted from the primary light source canes in, and a light emitting face from which the led light goes out; a light deflection element disposed adjacent to the light emitting face of the light guide; and a polarization separation element disposed on the side of a light outgoing surface of the light deflection element, and having a function of transmitting one of polarization components of an incident light and reflecting the other of the polarization components, wherein a full width at half maximum of a luminance distribution of the incident light upon the polarization separation element in a direction parallel to a travel direction of the light in the light guide is 25° or less.

BEST MODE FOR CARRYING OUT THE INVENTION

Embodiments of the present invention will be described hereinafter with reference to the drawings.

Figure 1:
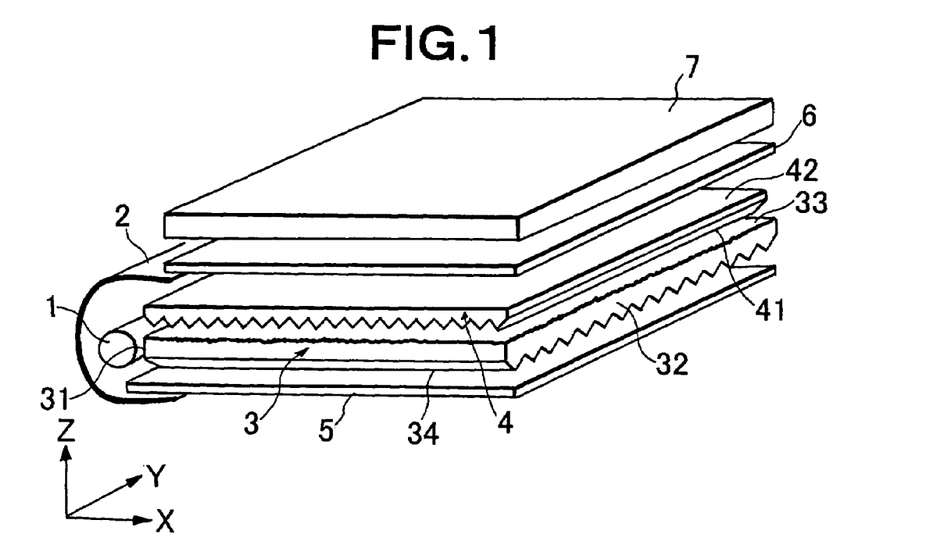
FIG. 1 is a schematic perspective view showing a planar light source device according to the present invention.
Figure 2:
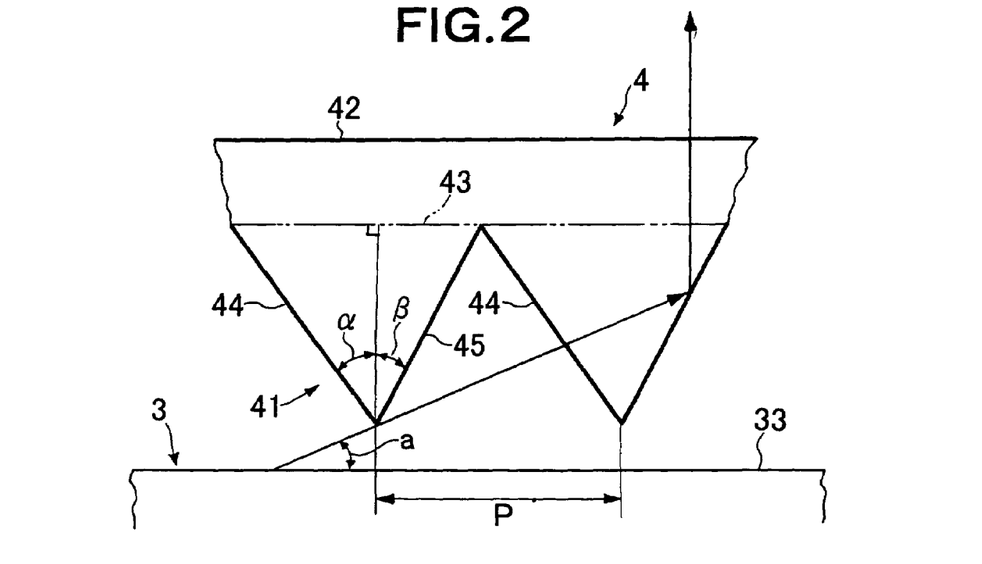
FIG. 2 is an explanatory view of a shape of an elongated prism of a light incoming surface of a light deflection element of the planar light source device according to the present invention.

FIG. 1 is a schematic perspective view showing one embodiment of a planar light source device according to the present invention. As shown in FIG. 1, the planar light source device of the present invention comprises: a light guide 3 whose at least one side end face is a light incident face 31 and whose one surface substantially crossing the light incident face at right angles is a light emitting face 33; a primary light source 1 disposed facing the light incident face 31 of the light guide 3 and covered with a light source reflector 2; a light deflection element 4 disposed on the light emitting face 33 of the light guide 3, and having a light incoming surface 41 and a light outgoing surface 42; a polarization separation element 6 disposed on the light outgoing surface 42 of the light deflection element 4; and a light reflection element 5 disposed facing a back surface 34 of the light guide 3 on the opposite side of the light emitting face 33. FIG. 1 also shows a liquid crystal display element 7 disposed on the polarization separation element 6 of the planar light source device. These components constitute a liquid crystal display device.

The polarization separation element 6 transmits one polarization component (transmission polarization plane) of light from the light deflection element 4, emits the light upwards in FIG. 1, and reflects the other polarization component (reflection polarization plane) toward the light deflection element 4. The element is disposed in such a manner that the transmission polarization plane agrees with a transmission direction of an incidence-side polarization plate of the liquid crystal display element 7.

As the polarization separation element 6, an element is preferably used in which a plurality of sheets each having double refraction properties and a predetermined thickness are stacked, and directionality of each stacked sheet is set in such a manner that a refractive index difference between the adjacent sheets is large in the transmission polarization plane, and reduced in the reflection polarization plane. As the polarization separation element 6, a combination of a film obtained by stacking cholesteric liquid crystal layers with a ¼ wavelength plate is also preferable. In this case, circularly polarized light in a certain direction is transmitted, and circularly polarized light in a reverse direction is reflected in the cholesteric liquid crystal layers. At this time, linearly polarized light can be taken out, when the ¼ wavelength plate is disposed on the cholesteric liquid crystal layers. The polarization separation element is disposed in such a manner that the direction of the linearly polarized light is regarded as the transmission polarization plane, and the direction agrees with the transmission direction of the incidence-side polarization plate of the liquid crystal display element 7.

To enhance the polarization separation ability of the polarization separation element 6, it is necessary to concentrate a luminance distribution of the light entering the polarization separation element 6 in the normal-line direction. The direction of the incident light is preferably set to 25° or less with respect to the normal-line direction of the polarization separation element 6, because transmittance with respect to the transmission polarization plane of the polarization separation element 6 and reflectance with respect to the reflection polarization plane of the polarization separation element 6 are enhanced. The direction of the incident light with respect to the normal-line direction of the polarization separation element 6 is more preferably 20° or less, further preferably 15° or less.

Therefore, a full width at half maximum of the luminance distribution of the incident light upon the polarization separation element 6 needs to be set to 25° or less in an XZ plane (direction parallel to a direction in which the light travels in the light guide) including both a direction vertical to the light incident face 31 of the light guide 3 and the normal-line direction of the light emitting face 33. The full width at half maximum is preferably 20° or less, further preferably 15° or less. On the other hand, when the full width at half maxima is set to be excessively small, a view field angle of the liquid crystal display device is excessively small. Therefore, the full width at half maximum of the luminance distribution in the XZ plane of the incident light upon the polarization separation element 6 is set to preferably 5° or more, more preferably 7° or more, especially preferably 10° or more. In the present invention, the full width at half maximum of the luminance distribution in the XZ plane of the light emitted from the light deflection element 4 may be set in the above-described range in order to set the full width at half maximum of the luminance distribution of the incident light upon the polarization separation element 6 as described above. It is to be noted that the full width at half maximum of the luminance distribution in the present invention refers to an angle of full width of a spread angle in a half value with respect to a peak value in the luminance distribution.

In general, as shown in FIG. 1, in the planar light source device in which as the light deflection element 4 is used an element formed by arranging a large number of elongated prisms extending in a direction substantially parallel to the light incident face 31 of the light guide 3 on one surface, and the light deflection element 4 is disposed in such a manner that the elongated prism forming surface faces the light guide, the luminance distribution of the light going out of the light deflection element 4 differs with the direction. Usually, the luminance distribution of the outgoing light from the light guide 3 in the XZ plane is narrowed, and further the luminance distribution can be further narrowed by a elongated prism shape or the like of the light deflection element 4. However, in a YZ plane (plane parallel to the light incident face 31 of the light guide 3, i.e., direction vertical to a direction in which the light travels in the light guide) including both the direction parallel to the elongated prism and the normal-line direction of the light emitting face 33, the luminance distribution of the outgoing light from the light guide 3 is also broad, and it is difficult to sufficiently narrow the luminance distribution with use of the light deflection element 4. Therefore, the full width at half maximum of the luminance distribution of the incident light upon the polarization separation element 6 in the YZ plane is set to preferably 50° or less, more preferably 45° or less, especially preferably 42° or less. On the other hand, when the full width at half maximum is set to be excessively small, the view field angle is excessively narrow in the liquid crystal display device. Therefore, the full width at half maximum is set to preferably 5° or more, more preferably 70 or more, especially preferably 10° or more. In the present invention, the full width at half maximum of the luminance distribution in the YZ plane of the outgoing light from the light deflection element 4 may be set in the above-described range in order to set the full width at half maximum in the luminance distribution of the incident light upon the polarization separation element 6 as described above.

In the present invention, an average value of the full width at half maximum in the luminance distribution of the incident light upon the polarization separation element 6 in the XZ plane and the YZ plane is preferably 33° or less, more preferably 30° or less, further preferably 28° or less, especially preferably 25° or less. The full width at half maximum of the luminance distribution in the XZ and YZ planes of the outgoing light from the light deflection element 4 may be set in the above-described range in order to set the full width at half maximum in the luminance distribution of the incident light upon the polarization separation element 6 as described above.

Figure 7:
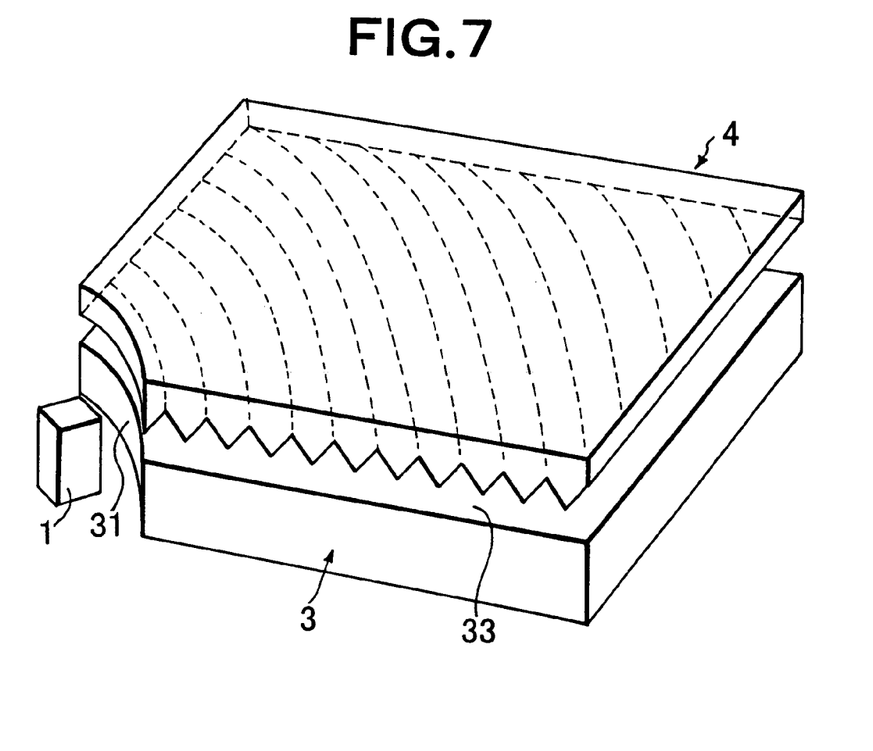
FIG. 7 is a schematic perspective view showing a light source device according to the present invention.

Moreover, as shown in FIG. 7, in a planar light source device in which a spot-like light source is used as the primary light source 1, an element having a large number of arc elongated prisms juxtaposed on one surface so as to surround the spot-like primary light source 1 is used as the light deflection element 4, and the light deflection element 4 is disposed in such a manner as to dispose the elongated prism forging surface on the light guide side, the luminance distribution of the light going out of the light deflection element 4 can be narrowed both in the direction parallel to the direction in which the light travels in the light guide and the direction vertical to the light traveling direction in the light guide. Therefore, the planar light source device is very suitable for enhancing the polarization separation ability of the polarization separation element 6. In this case, with regard to the full width at half maximum of the luminance distribution of the incident light upon the polarization separation element 6, and that of the luminance distribution of the outgoing light from the light deflection element 4, an average value of the full width at half maximum in a direction parallel to a direction in which the light enters the light guide, and that in a direction vertical to the direction in which the light travels in the light guide is set to preferably 15° or less, more preferably 12° or less, further preferably 10° or less.

Moreover, the full width at half maximum in the luminance distribution of the incident light upon the polarization separation element 6, and that in the luminance distribution of the outgoing light from the light deflection element 4 need to be set to 25° or less, preferably 20° or less, further preferably 15° or less in the direction parallel to the direction in which the light travels in the light guide. On the other hand, when the full width at half maximum is set to be excessively small, the view field angle of the liquid crystal display device is excessively small. Therefore, the full width at half maximum is set to preferably 5° or more, more preferably 7° or more, especially preferably 10° or more.

Furthermore, in the direction vertical to the direction in which the light travels in the light guide, the full width at half maximum in the luminance distribution of the incident light upon the polarization separation element 6, and that in the luminance distribution of the outgoing light from the light deflection element 4 are preferably 30° or less, further preferably 25° or less, especially preferably 20° or less. On the other hand, when the full width at half maximum is set to be excessively smell, the view field angle of the liquid crystal display device is excessively snail. Therefore, the full width at half maximum is set to preferably 5° or more, more preferably 7° or more, especially preferably 10° or more.

FIGS. 2 to 6 are explanatory views of a shape of an XZ section of the elongated prism of the light deflection element 4 for use in the planar light source device of the present invention. In the light deflection element 4, one of major surfaces is regarded as the light incoming surface 41, and the other major surface is regarded as the light outgoing surface 42. A large number of elongated prisms are substantially juxtaposed/arranged on the light incoming surface 41. Each elongated prism comprises two prism faces of a first prism face 44 positioned on the side of a light source, and a second prism face 45 positioned on the side distant from the light source. In the embodiment shown in FIG. 2, both the first prism face 44 and the second prism face 45 are flat faces. In the planar light source device of the present invention, an apex angle $(\alpha+\beta)$ of the elongated prism is in a range of preferably 35° to 80°, more preferably 35° to 75°, further preferably 40° to 70°. In this range, a direction (direction of peak light) in which intensity of the light going out of the light deflection element 4 is highest can be substantially matched with the normal-line direction of the polarization separation element 6, and a high polarization separation ability in the polarization separation element 6 is obtained.

In a vertical direction (XZ plane) vertical to an incident face of the light guide 3, to further concentrate the luminance distribution of the outgoing light from the light deflection element 4 in the normal-mine direction of the polarization separation element 6, as shown in FIGS. 3 to 6, an inclination angle of the second prism face 45 of the light deflection element 4 is preferably formed in such a manner as to increase as approaching to the light outgoing surface 42. As a result, the outgoing light totally reflected by the whole second prism face can be condensed in a certain direction, and it is possible to emit light having high directivity and large luminance of peak light. In this case, the second prism face 45 nay be formed of a convex curved face, or two or more flat faces and/or convex curved faces having different inclination angles.

Figure 3:
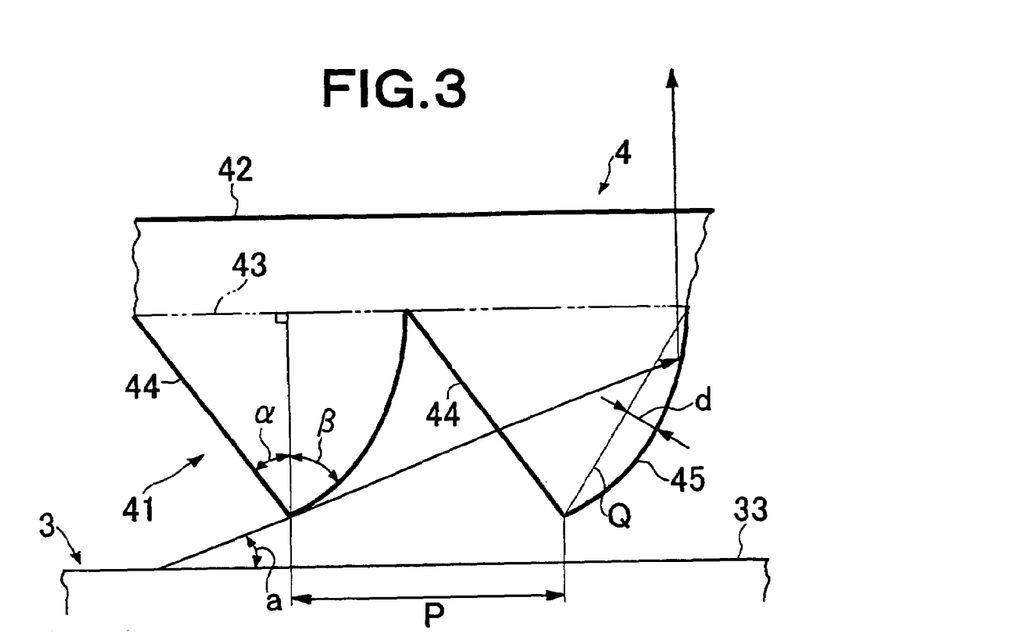
FIG. 3 is an explanatory view of the shape of the elongated prism of the light incoming surface of the light deflection element of the planar light source device according to the present invention.

When the second prism face 45 is formed of the convex curved face as shown in FIG. 3, a ratio (r/P) of a curvature radius (r) of the convex surface to a pitch (P) of the elongated prism is in a range of preferably 2 to 50, more preferably 5 to 30, further preferably 7 to 20, especially preferably 7.5 to 15 in order to further enhance a condensing property by the light deflection element 4. A ratio (d/P) of a distance (d) between a virtual plane Q connecting a prism apex portion of the second prism face 45 to a prism bottom portion thereof, and the convex curved face with respect to the pitch (P) of the elongated prism is in a range of preferably 0.05 to 5%, more preferably 0.1 to 3%, further preferably 0.2 to 2%, especially preferably 0.7 to 1.5%.

Moreover, when the second prism face 45 is formed of two or more flat faces and/or convex curved faces having different inclination angles, the number of the flat faces or the convex curved faces is set to preferably three or more, more preferably five or more, further preferably six or more. When the face number is excessively small, the condensing property by the light deflection element 4 drops, and a luminance enhancing effect tends to be impaired. On the other hand, when the face number is increased, the direction of the peak light over the whole second prism face 45 can be finely adjusted. Therefore, a degree of concentration as a whole can be enhanced. However, the flat faces having different inclination angles have to be formed finely. Therefore, designing or manufacturing of a cutting tool for cutting a mold to form a prism pattern of the light deflection element 4 becomes complicated, and it is difficult to stably obtain the light deflection element 4 having a certain optical characteristic. Therefore, the number of faces to be formed on the second prism face 45 is set to preferably 20 or less, more preferably 12 or less. The second prism face 45 is preferably equally divided into flat faces and/or convex ailed faces, but does not have to be necessarily divided in such a manner, and can be adjusted in accordance with a desired outgoing light luminance distribution (in the XZ plane). A width (length of each face portion in a elongated prism section) of each face having different inclination angle is set to a range of 4 to 47%, more preferably 6 to 30%, further preferably 7 to 20% with respect to the pitch of the elongated prism.

The second prism face 45 comprises at least two flat faces having different inclination angles, the inclination angles of these flat faces increase closer to the light outgoing surface 42, and a difference of the inclination angle between the flat face closest to light outgoing surface and that most distant from the light outgoing surface is set to 15° or less. Consequently, a remarkably high light condensing effect can be exerted, and a remarkably high luminance of the light source device can be obtained. The difference of the inclination angle between the flat face closest to light outgoing surface and that most distant from the light outgoing surface is in a range of preferably 0.5 to 10°, more preferably 1 to 7°. It is to be noted that when three or more flat faces having different inclination angles are forced, the difference of the inclination angle is preferably set to the above-described range, but is not especially limited to this range, When the second prism face 45 is structured in this manner, a light deflection element having a desired light condensing property can be easily designed, and a light deflection element having the certain optical characteristic can be stably manufactured. It is to be noted that a matter concerning the difference of the inclination angle similarly applies even to a case where the second prism face comprises a plurality of convex curved faces, or a combination of the convex curved face with the flat face.

In the present invention, the inclination angle in the flat face or the convex curved face refers to the inclination angle with respect to an elongated prism formed flat plane 43, that in the convex cured face refers to an averaged inclination angle of tangent lines in a plurality of positions of the convex curved face with respect to the elongated prism formed flat plane 43, and an inclination angle of a straight line (chord) connecting opposite ends of the convex curved face say be used.

Figure 4:
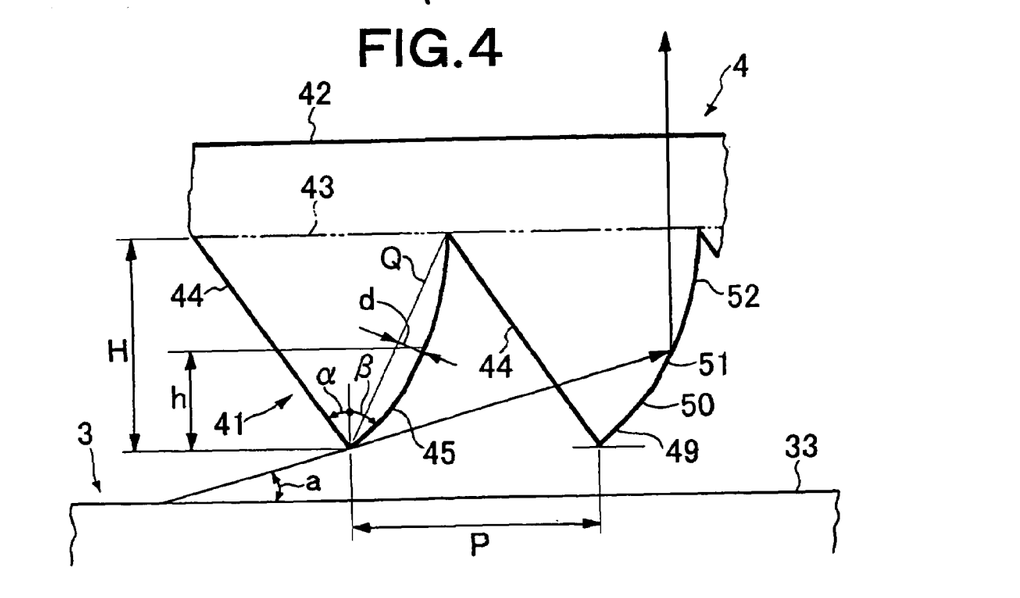
FIG. 4 is an explanatory view of the shape of the elongated prism of the light incoming surface of the light deflection element of the planar light source device according to the present invention.
Figure 5:
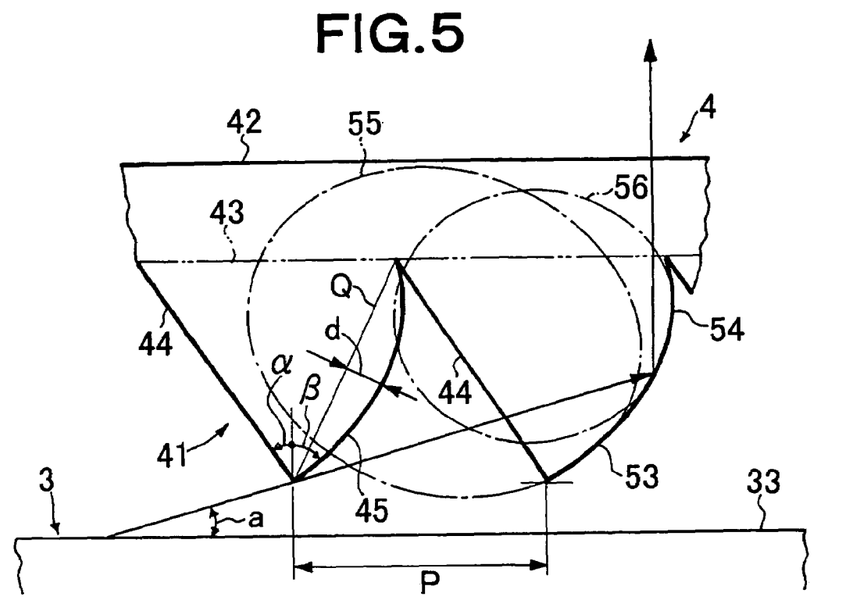
FIG. 5 is an explanatory view of the shape of the elongated prism of the light incoming surface of the light deflection element of the planar light source device according to the present invention.
Figure 6:
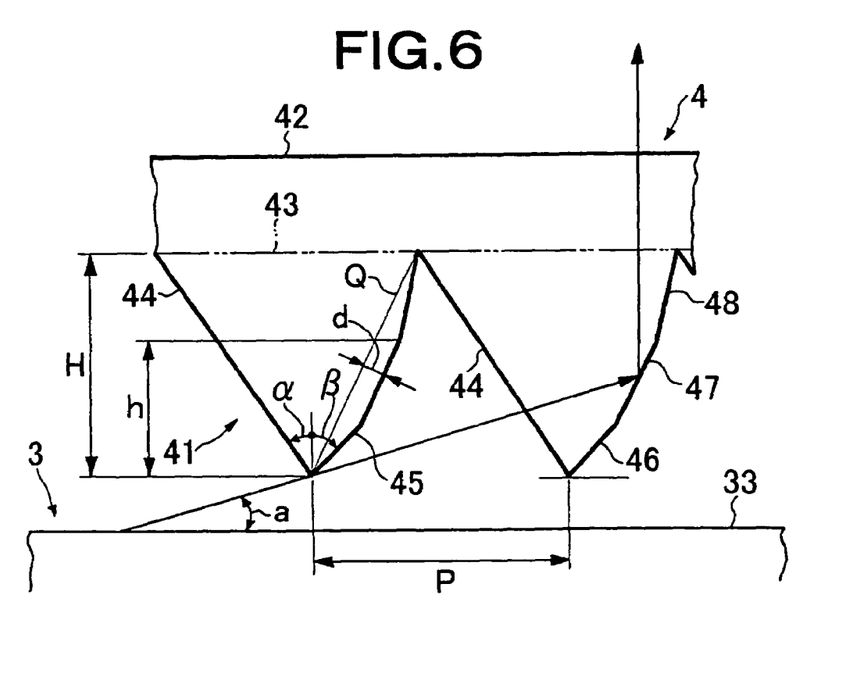
FIG. 6 is an explanatory view of the shape of the elongated prism of the light in coming surface of the light deflection element of the planar light source device according to the present invention.

In the present invention, for example, as shown in FIGS. 4 and 5, at least one of the flat faces having the different inclination angles may be replaced with a convex curved face 52, 53, or 54 (49 to 51 are flat faces), or all the flat faces may be replaced with convex curved faces. As shown in FIG. 6, all faces may be flat faces 46 to 48.

As to the shape of the convex curved face, the shape of the XZ section may be set to be circular arc or non-circular arc. Furthermore, when a plurality of convex curved faces constitute the prism face, the shapes of the respective convex curved faces are preferably different, the convex curved face having a circular arc sectional shape may be combined with that having a non-circular arc sectional shape, and at least one convex curved face is preferably formed into a non-circular arc sectional shape. When the plurality of convex curved faces are formed into the circular arc sectional shapes, curvature of each convex curved face may be changed. Examples of the non-circular arc sectional shape include a part of an elliptic shape, a part of a parabolic shape and the like.

Furthermore, the ratio (r/P) of the curvature radius. (r) of the convex curved face to the pitch (P) of the elongated prism is set to a range of preferably 2 to 50, more preferably 5 to 30, further preferably 7 to 20, especially preferably 7.5 to 15. When this r/P is less than 2, or exceeds 50, a sufficient light condensing characteristic cannot be exerted, and the luminance tends to drop.

Moreover, when the second prism face 45 comprises a plurality of flat faces or convex curved faces having different inclination angles, the ratio (d/P) of the maximum distance d between the virtual flat plane Q connecting the apex portion of the elongated prism to the bottom portion thereof, and a plurality of flat faces or convex curved faces (faces forming an actual prism face) with respect to the pitch (P) of the elongated prism is set to preferably 0.05 to 5% in order to secure the sufficient light condensing characteristic. This is because the light condensing characteristic tends to drop, and sufficient luminance enhancement tends to be impossible, when d/P is less than 0.05% or exceeds 5%. The d/P is in a range of more preferably 0.1 to 3%, further preferably 0.2 to 2%, especially preferably 0.7 to 1.5%.

Furthermore, in order to enhance the light condensing characteristic, as shown in FIGS. 4 and 6, at least two flat faces and/or convex curved faces are preferably formed in a region having a height h from the prism apex portion, and assuming that a height of the elongated prism is H, h/H is preferably 60% or less.

In the present invention, right/left distributing angles (inclination angles of two prism laces with respect to a normal line) α, β of the prism apex angle with respect to the normal line may be equal or different. However, to efficiently enhance the luminance in the substantial normal-line direction (referring to a range of ±10° in the XZ plane in a case where the normal-line direction is set to 0°), the angles are preferably set to different angles. In this case, the distributing angle α positioned on the light source side is preferably set to 40° or less, and β is set to a range of 25 to 50°. When there is a slight difference between the distributing angles α, β of the apex angle, a light use efficiency rises, and luminance can be further enhanced. Therefore, the distributing angle α is preferably set to a range of 25 to 40°, and the distributing angle β is preferably set to a range of 25 to 45°. An absolute value (|α−β|) of the difference between the distributing angles α, β is set to a range of preferably 0.5 to 10°, more preferably 1 to 10°, further preferably 1 to 8°. It is to be noted that in a case where the peak light in the outgoing light luminance distribution (in the XZ plane) is in a direction other than the substantial normal-line direction, the distributing angles α, β of the prism apex angle are adjusted, so that the outgoing light luminance distribution (in the XZ plane) having the peak light in a desired direction can be obtained.

Moreover, when the distributing angle α is set to 20° or less, the light use efficiency can be raised, and the luminance can be further enhanced. When the distributing angle α is reduced, the light use efficiency can be raised. However when the distributing angle α is set to be excessively small, the apex angle of the elongated prism decreases, and it is difficult to form a prism pattern. Therefore, the distributing angle α is set to a range of preferably 3 to 15°, more preferably 5 to 10°. In this case, to set the peak light in the outgoing light luminance distribution (in the XZ plane) to a range of ±2° with respect to the normal-line direction and to enhance normal-line luminance, the distributing angle β may be set to a range of 35 to 40°.

When the distributing angle α is set to 20° or less in this manner, a ratio (ratio L2/L1 of a length L2 of a straight line distant from the light source with respect to a length L1 of a straight line close to the light source) of lengths of two straight lines connecting the prism apex portion to a valley portion in the sectional shape of the elongated prism is preferably set to 1.1 or more. This is because the light incident on the prism face in the vicinity of the light source can be efficiently received by the prism face distant from the light source, the light use efficiency can be raised, and the luminance can be further enhanced, when L2/L1 is set to 1.1 or more. L2/L1 is more preferably 1.15 or more, further preferably 1.17 or more. On the other hand, when the pitch P of the elongated prism is constant, and when the L2/L1 is set to be excessively large, the apex angle of the elongated prism tends to decrease, and it is difficult to form the prism pattern. Therefore, L2/L1 is set to preferably 1.3 or less, more preferably 1.25 or less, further preferably 1.2 or less. A ratio (L2/P) of the length L2 of the straight line distant from the light source with respect to the pitch P of the elongated prism is preferably set to 1.25 or more for similar reasons. The L2/P is further preferably 1.3 or more, further preferably 1.4 or more. On the other hand, when L2/P is set to be excessively large, the apex angle of the elongated prism tends to decrease, and it is difficult to form the prism pattern. Therefore, L2/P is set to preferably 1.8 or less, more preferably 1.6 or less, further preferably 1.5 or less.

In the present invention, the second prism face 45 which is a prism face distant from the primary light source 1 as described above is formed into a non-single flat face (referring to a face other than a single flat face), and accordingly a distribution width can be sufficiently reduced in the outgoing light luminance distribution (in the XZ plane) of the light going out of the light deflection element 4 in a case where the primary light source is disposed on the end face 31 of the light guide 3. The prism face (first prism face 44) closer to the primary light source 1 is more preferably formed into a similar shape, in a case where a ratio at which the light propagating in the light guide 3 is reflected by an end face 32 on the opposite side of the light incident face 31 and returns is comparatively high, or the primary light sources 1 are disposed on two facing end faces of the light guide 3. On the other hand, at a comparatively low ratio at which the light propagating in the light guide 3 is reflected by the end face 32 on the opposite side of the light incident face 31 and returns, the prism face in the vicinity of the primary light source 1 is preferably formed into a substantially flat face. In the light deflection element 4 of the present invention, the vicinity of the apex portion of the prism face preferably comprises a substantially flat face. Accordingly, it is possible to more precisely form the shape of a transfer face of a forming mold member for forming the elongated prism, and a sticking phenomenon in disposing the light deflection element 4 on the light guide 3 can be inhibited from being caused.

The light guide 3 is disposed in parallel with an XY plane, and forms a rectangular plate shape as a while. The light guide 3 has four side end faces, and at least one side end face of a pair of side end faces substantially parallel to the YZ plane is assumed as the light incident face 31. The light incident face 31 is disposed facing the primary light source 1, and the light emitted from the primary light source 1 enters the light guide 3 from the light incident face 31. In the present invention, for example, the primary light source may be disposed on another side end face such as a side end face 32 facing the light incident face 31.

Two major faces substantially crossing the light incident face 31 of the light guide 3 at right angles are positioned substantially in parallel with the XY plane, and either one face (upper surface in the drawing) is the light emitting face 33. A directive light emitting function structure formed of a rough surface, or a directive light emitting function structure formed of a lens face on which a large number of elongated lenses such as elongated prisms, elongated lenticular lenses, and V-shaped grooves are formed substantially in parallel with the light incident face 31 is disposed on at least one of the light emitting face 33 and the back surface 34 on the opposite side thereof. Accordingly, while the light that has struck on the light incident face 31 is guided in the light guide 3, light having directivity in an emitted light distribution in a plane (XZ plane) crossing both the light incident face 31 and the light emitting face 33 at right angles is emitted from the light emitting face 33. Assuming that an angle formed by the direction of peak of the emitted light distribution in the XZ plane with the light emitting face 33 is a, the angle a is preferably set to 10 to 40°, and the full width at half maximum of the emitted light distribution is preferably set to 10 to 40°.

In the rough surface or the elongated lens formed on the surface of the light guide 3, an average inclination angle θa by ISO4287/1-1984 is preferably set to a range of 0.5 to 15° in order to improve a uniformity of luminance in the light emitting face 33. The average inclination angle θa is in a range of further preferably 1 to 12°, more preferably 1.5 to 11°. An optimum range of the average inclination angle θa is preferably set in accordance with a ratio (L/t) of a length (L) of the light guide 3 in a direction in which the incident light propagates with respect to a thickness (t) of the light guide 3. That is, when the light guide 3 having L/t of about 20 to 200 is used, the average inclination angle θa is set to a range of preferably 0.5 to 7.5°, further preferably 1 to 5°, more preferably 1.5 to 4°. When the light guide 3 having L/t of about 20 or less is used, the average inclination angle θa is set to a range of preferably 7 to 12°, further preferably 8 to 11°.

According to ISO4287/1-1984, a rough surface shape is measured using a probe system surface roughness gauge, coordinate in a measurement direction is assumed as x, and the average inclination angle θa of the rough surface formed on the light guide 3 can be obtained from an obtained inclination function f(x) using the following equations (1) and (2). Here, L denotes a measurement length, and Δa is tangent of the average inclination angle θa:

$$\Delta a = (1/L) \int_0^L |(d/dx)f(x)| dx \quad (1); \text{ and}$$

$$\theta a = \tan^{-1}(\Delta a) \quad (2).$$

Furthermore, light emission ratio of the light guide 3 is in a range of preferably 0.5 to 5%, are preferably 1 to 3%. When the light emission ratio is smaller than 0.5%, a quantity of light emitted from the light guide 3 is reduced, and there is a tendency that sufficient luminance is not obtained. When the light emission ratio is larger than 5%, a large quantity of light is emitted in the vicinity of the primary light source 1, attenuation of the light in an X-direction in the light emitting face 33 is remarkable, and there is a tendency that the uniformity of luminance in the light emitting face 33 drops. When the light emission ratio of the light guide 3 is set to 0.5 to 5% in this manner, the light having a high-directivity emission characteristic can be emitted from the light guide 3 in such a manner that an angle (peak angle) of the peak light in the emitted light distribution (in the XZ plane) of the light going out of the light emitting face is in a range of 50 to 80° with respect to the normal line of the light emitting face, and the full width at half maximum of the emitted light distribution (in the XZ plane) is 10 to 40°. Emission direction of the light emitted can be efficiently deflected by the light deflection element 4, and there can be provided a planar light source device having a high luminance.

In the present invention, the light emission ratio from the light guide 3 is defined as follows. Light intensity ($I_0$) of the emitted light in an edge of the light emitting face 33 on the side of the light incident face 31 and emitted light intensity (I) in a position at a distance L from the edge on the light incident face 31 side satisfies a relation of the following equation (3), assuming that the thickness (Z-direction dimension) of the light guide 3 is t:

$$I = I_0 \cdot \alpha (1-\alpha)^{L/t} \text{tm} \quad (3),$$

where constant $\alpha$ is a light emission ratio, i.e. a ratio (%) at which the light goes out of the light guide 3 per unit length (length corresponding to the light guide thickness t) in the light emitting face 33 in an X-direction crossing the light incident face 31 at right angles. When a logarithm of the light intensity of the emitted light from the light emitting face 23 is indicated on the ordinate, (L/t) is indicated on the abscissa, and the relation is plotted, the light emission ratio $\alpha$ can be obtained from gradient.

A lens face on which a large number of elongated lenses extending in a direction (X-direction) substantially vertical to the light incident face 31 are arranged is preferably formed on the other major surface to which a directivity light emission function structure is not imparted in order to control the directivity of the emitted light from the light guide 3 in a plane (YZ plane) parallel to the primary light source 1. In the embodiment shown in FIG. 1, a rough surface is formed on the light emitting face 33, and a lens face constituted of arrangement of a large number of elongated lenses extending in a direction (X-direction) substantially vertical to the light incident face 31 is formed on the back surface 34. In the present invention, conversely to the mode shown in FIG. 1, the lens face may be formed on the light emitting face 33, and the back surface 34 may be formed into a rough surface.

When the elongated lenses are formed on the back surface 34 or light emitting face 33 of the light guide 3 as shown in FIG. 1, examples of the elongated lenses include elongated prisms, elongated lenticular lenses, V-shaped grooves and the like extending substantially in the X-direction. Elongated prisms in which a shape of a YZ section is substantially triangular are preferable.

In the present invention, when the elongated prisms are formed as the elongated lenses formed on the light guide 3, an apex angle thereof is preferably set to a range of 70 to 150°. When the apex angle is set to this range, the emitted light from the light guide 3 can be sufficiently condensed, and the luminance of the planar light source device can be sufficiently enhanced. That is when the prism apex angle is set to this range, it is possible to emit the condensed emitted light whose full width at half maximum of the emitted light distribution is 35 to 65° in a plane including peak light of the emitted light distribution (in the XZ plane) and extending vertically to the XZ plane, and the luminance of the planar light source device can be enhanced. It is to be noted that when the elongated prisms are formed on the light emitting face 33, the apex angle is preferably set to a range of 80 to 100°. When the elongated prisms are formed on the back surface 34, the apex angle is preferably set to a range of 70 to 80° or 100 to 150°.

It is to be noted that in the present invention, instead of or in addition to the above-described light emission function structure formed on the light emitting face 33 or the back surface 34, light diffusing articulates may be mixed/dispersed in the light guide to thereby i the directive light emission function. The light guide 3 is not limited to the sectional shape shown in FIG. 1, and various sectional shapes such as a wedge shape and a boat shape are usable.

A polarization component reflected by the polarization separation element 6 enters the backlight unit again, is reflected by the back surface of the Light guide 3, and enters the polarization separation element 6 again. At this time, it is preferable that polarized states have been changed and a component which passes through the polarization separation element 6 has increased. In this case, the direction in which the elongated lenses formed on the light guide 3 extends preferably obliquely crosses a direction of a transmission polarization face of the polarization separation element 6. In this constitution, the polarized state is easily changed by the elongated lenses of the light guide 3.

A linear light source extending in a Y-direction is usable as the primary light source 1. For example, a fluorescence lamp or a cold cathode tube is usable as the primary light source 1. It is to be noted that in the present invention, the primary light source 1 is not limited to the linear light source, and spot light sources such as an LED light source, halogen lap, and metallic halide lamp are usable. Especially, when the light source is used in a display device having a cooperatively small screen dimension, such as a cellular phone and a portable information terminal, a small spot light source such as an LED is preferably used. The primary light source 1 is disposed facing one side end face of the light guide 3 as shown in FIG. 1, but may be further disposed on the other side end face facing the above one side end face, if necessary.

For example, as shown in FIG. 7, when a substantially spotted light source such as an LED light source used as the primary light source 1 is disposed on a corner or the like of the light guide 3, the light that has entered the light guide 3 radially propagates therein substantially centering on the primary light source 1 in the same plane as the light emitting face 33. The emitted light which goes out of the light emitting face 33 similarly goes out radially centering on the primary light source 1. The elongated prism formed on the light deflection element 4 is preferably substantially juxtaposed and arranged substantially in such an arc shape to surround the primary light source 1 in order to deflect the radially emitted light in a desired direction with satisfactory efficiency regardless of the emission direction. When the elongated prism is substantially juxtaposed and arranged substantially in such an arc shape to surround the primary light source 1 in this manner, most of the light radially emitted from the light emitting face 33 enters the elongated prism of the light deflection element 4 substantially vertically. Therefore, the emitted light can be directed in a specific direction with satisfactory efficiency in the whole region of the light emitting face 33 of the light guide 3, and especially the separation ability of the polarization separation element 6 can be enhanced as described above. Furthermore, the luminance can also be enhanced. As to the substantially arc-shaped elongated prism formed on the light deflection element 4, a degree of the arc shape is selected in accordance with distribution of the light propagating in the light guide 3, and most of the light emitted radially from the light emitting face 33 preferably substantially vertically enters the elongated prism of the light deflection element 4. Concretely, for example, the elongated prisms are substantially juxtaposed and arranged in a concentric shape substantially centering on the spot light source like the LED in such a manner that a radius of circular arc gradually increases. A range of the radius of the elongated prism is determined by the position of the spot light source in the planar light source system, and a positional relation or a size with respect to an effective area of the planar light source corresponding to a liquid crystal display area.

The light source reflector 2 guides the light of the primary light source 1 into the light guide 3 with little loss. For example, a plastic film having a metal evaporated reflective layer on the surface thereof is usable as a material. As shown in FIG. 1, the light source reflector 2 is wound to a light outgoing surface edge portion of the light deflection element 4 from an edge portion outer surface of the light reflection element via the outer surface of the primary light source 1. On the other hand, the light source reflector 2 may be wound to the light emitting face edge portion of the light guide 3 from the edge portion outer surface of the light reflection element 5 via the outer surface of the primary light source 1 avoiding the light deflection element 4.

A reflective member similar to the light source reflector 2 may be attached to a side end face other than the side end face 31 of the light guide 3. For example, the plastic sheet having the metal evaporated reflective layer on the surface thereof is usable as the light reflection element 5. In the present invention, a light reflective layer or the like formed on the back surface 34 of the light guide 3 by metal evaporation or the like may be used as the light reflection element 5 instead of the reflective sheet.

It is to be noted that the reflective sheet is preferably disposed as the light reflection element 5 on the back surface of the light guide 3 in order to securely reflect the light reflected by the polarization separation element 6 and returned on the backlight unit and to allow the light to enter the polarization separation element 6 again. A sheet-like regularly reflective member whose surface is coated with a metal, or a sheet-like diffusion reflective member formed of a white PET film or the like is usable as the reflective sheet. The reflective sheet 5 is preferably provided with a concave/convex shape to thereby promote a change of the polarized state. For example, a reflective sheet on which a large number of corner cubes are arranged is usable.

The light guide 3 and the light deflection element 4 in the planar light source device of the present invention ray comprise a synthetic resin having high light transmittance. Examples of the synthetic resin include a methacrylic resin, acrylic resin, polycarbonate-based resin, polyester-based resin, and vinyl chloride based resin. Especially, the methacrylic resin has high light transmittance, and superior heat resistance, mechanical property, and forming/working property, and is optimum. As the methacrylic resin, a resin mainly composed of methyl methacrylate and containing 80 weight % or more methyl methacrylate is preferable, When a surface structure of the rough surface, the elongated prism or the like of the light guide 3 or the light deflection element 4 is formed, the structure may be formed by thermally pressing a transparent synthetic resin plate using a die member having a desired surface structure, or the shape may be formed simultaneously with molding by screen printing, extrusion, injection or the like. The structure surface may be formed using a thermal or photo setting resin or the like. Furthermore, a rough surface structure or an elongated lens arrangement structure formed of an active energy ray setting resin may be formed on the surface of a transparent substrate or a transparent film or sheet formed of a polyester-based resin, acrylic resin, polycarbonate-based resin, vinyl chloride based resin, polymethacrylic imide based resin or the like, or the sheet may be bonded/integrated onto/with a separate transparent substrate by methods such as bonding and fusion-bonding. As the active energy ray setting resin, a multifunctional (meth)acrylic compound, vinyl compound, (meth)acrylic ester, aryl compound, (meth)acrylic metal salt or the like is usable.

The liquid crystal display element 7 is disposed on a light emission surface (light outgoing surface of the polarization separation element 6) of the planar light source device constituted of the above-described primary light source 1, light source reflector 2, light guide 3, light deflection element 4, light reflection element 5, and polarization separation element 6, and accordingly a liquid crystal display device is constituted. The liquid crystal display device is observed by an observer through the liquid crystal display element from above in FIG. 1. In the present invention, since sufficiently collimated light having a narrow luminance distribution can be applied into the polarization separation element 6, high polarization separation ability is obtained, and luminance during the observing through the liquid crystal display element 7 becomes high. Since the sufficiently collimated light can be applied into the liquid crystal display element 7, satisfactory image display having brightness and hue uniformity without any gradation reverse is obtained with the liquid crystal display element 7. Moreover, light irradiation concentrated in a desired direction is obtained, and use efficiency of the emitted light quantity of the primary light source with respect to illumination in this direction.

Furthermore, in the present invention, a light diffusion element may be disposed in order to appropriately control a view field range in accordance with a purpose without causing any drop of luminance if possible in the planar light source device whose view field is narrowed and whose luminance is raised by the light deflection element 4 as described above. When the light diffusion element is disposed in this manner, glare, luminance unevenness and the like causing a drop of quality level are suppressed, and the quality level can be enhanced. This will be further described hereinafter.

The light diffusion element may be integrated with the light deflection element 4 on the side of the light outgoing surface of the light deflection element 4, or may be individually disposed, and it is preferable to individually dispose the light diffusion element. For example, the light diffusion element may take the form of a light diffusing sheet. The light diffusion element is preferably disposed on the light emitting surface of the polarization separation element 6 in order to enhance the separation ability by the polarization separation element 6. By this arrangement, after the light condensed in the normal-line direction enters the polarization separation element 6, and is polarized/separated, view field range adjustment or quality level enhancement is performed by the light diffusion element. A concave/convex structure is preferably formed on the surface (incident surface) of the light diffusion element adjacent to the polarization separation element 6 in order to prevent sticking to the polarization separation element 6. Similarly, prevention of sticking of the light diffusion element to the display element 7 disposed on the light emitting surface of the light diffusion element needs to be considered, and it is preferable to form the concave/convex structure on the light emitting surface of the light diffusion element. When this concave/ convex structure is applied only for a purpose of preventing the sticking, the structure has an average inclination angle of preferably 0.7° or more, further preferably 1° or more, more preferably 1.5° or more. Even when the light diffusion element is disposed on the side of the light emitting face of the liquid crystal display element 7, the similar effect is obtained.

Figure 8:
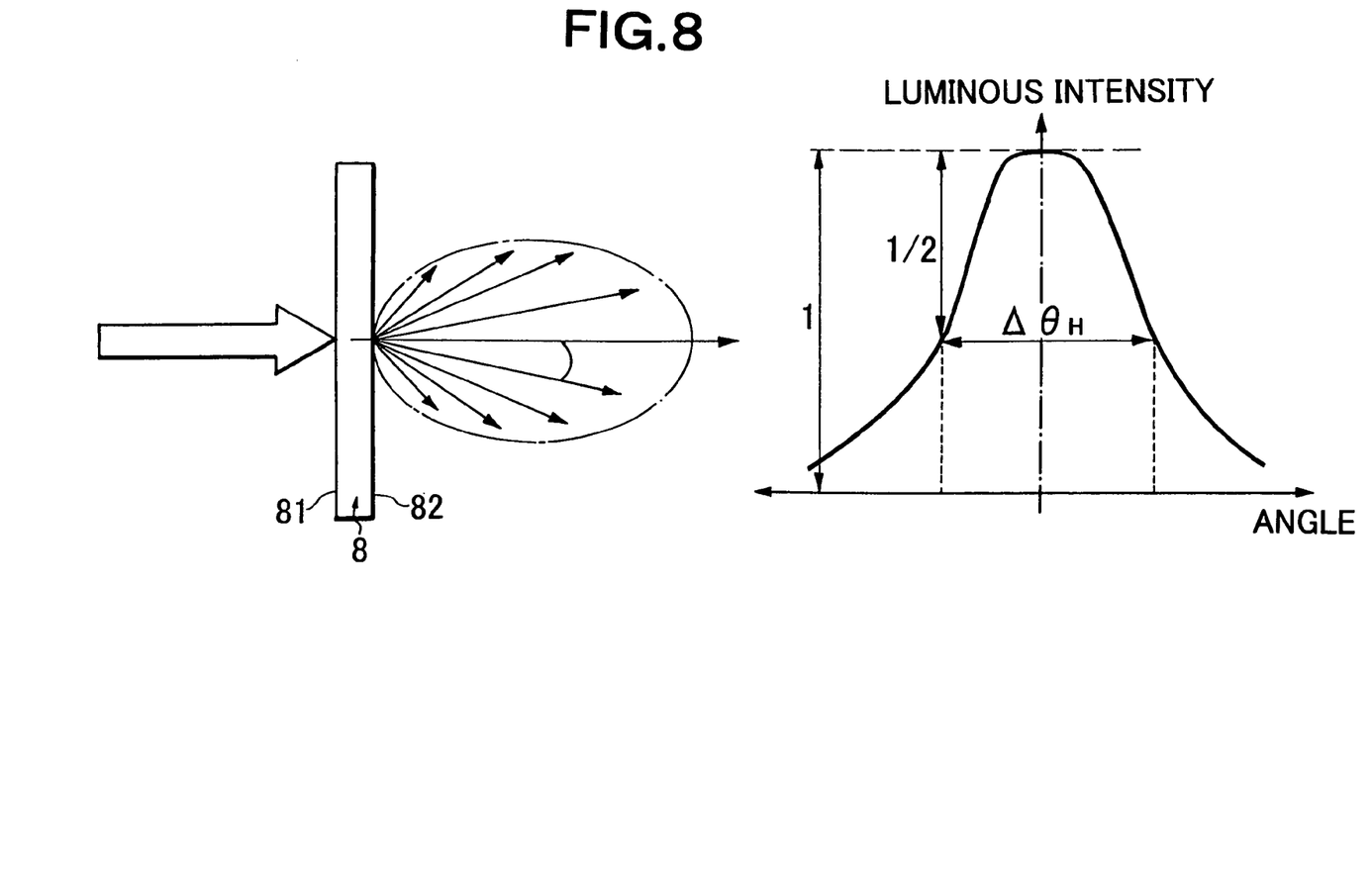
FIG. 8 is an explanatory view of a full width at half maximum of an emitted light luminous intensity distribution (in XZ plane) of a light diffusion element of the planar light source device according to the present invention.

In the present invention, it is preferable to use the light diffusion element having a light diffusion characteristic for appropriately diffusing the emitted light from the light deflection element 4 in consideration of balances of luminance characteristic, visibility, quality level and the like. That is, when the light diffusion property of the light diffusion element is low, it is difficult to sufficiently broaden a view field angle, and there is a tendency that visibility improving effect or quality level improving effect is not sufficient. Conversely, when a light diffusing property is excessively high, an effect of narrowing the view field by the light deflection element 4 is impaired, total light ray transmittance also drops, and there is a tendency that the luminance drops. Therefore, in the present invention, an element whose full width at half maximum of the emitted light distribution (in the XZ plane) when applying parallel light is in a range of 1 to 13° is used as the light diffusion element. The full width at half maximum of the light diffusion element is in a range of preferably 3 to 11°, further preferably 4 to 8.5°. It is to be noted that in the present invention, the fall width at half maximum of the emitted light distribution (in the XZ plane) of the light diffusion element indicates a degree by which the parallel light ray applied into a light diffusion element 8 having a light incident surface 81 and a light emitting surface 82 as shown in FIG. 8 diffuses and spreads when being emitted, and refers to an angle ($\Delta\theta_H$) of the full width of the spread angle at a half value with resect to a peak value in the emitted light distribution (in the XZ plane) of the light transmitted and diffused through the light diffusion element B.

The light diffusion characteristic can be imparted, when a light diffusing agent is mixed in the light diffusion element 8, or the concave/convex structure is formed on at least one surface of the light diffusion element 8. A degree of the concave/convex structure formed on the surface differs in a case where the structure is formed on one surface of the light diffusion element 8 and in another case where the structures are formed on opposite surfaces. When the concave/convex structure is formed on one surface of the light diffusion element 8, the average inclination angle is set to a range of preferably 0.8 to 12°, further preferably 3.5 to 7°, further preferably 4 to 6.5°. When the concave/convex structures are formed on the opposite surfaces of the light diffusion element 8, the average inclination angle of the concave/convex structure formed on one surface is set to a range of preferably 0.8 to 6°, further preferably 2 to 4°, more preferably 2.5 to 4°. In this case, the average inclination angle of the light diffusion element 8 on the light incident surface side is preferably set to be larger than that on the light emitting surface side. It is preferable to set a haze value of the light diffusion element 8 to a range of 8 to 82% from viewpoints of luminance characteristic enhancement and visibility improvement, and the value is in a range of further preferably 30 to 70%, more preferably 40 to 65%.

In the present invention, according to method B of JIS K-7105, the haze value can be calculated and obtained from a total light ray transmittance (Tt) and a diffused light ray transmittance (Td) obtained using an integrating sphere system reflection transmittance gauge (RT-100 type manufactured by Murakemi Sikisai Gijutsu Kenkyusha) by the following equation (4) with respect to a sample having a size of 50 mm×50 mm:

$$\text{Haze value (\%)} = 100(Td/Tt) \tag{4}$$

In the planar light source device of the present invention, it is demanded that luminance in a display area be uniform in case of observation of the light emission surface (e.g., the light emitting surface of the light diffusion element 8) from the normal-line direction. The uniformity of the luminance depends also on the size of the display area of the planar light source device. For example, in a large-sized planar light source device having a large display area for a notebook-size personal computer, monitor or the like, a comparatively broad view field angle characteristic is sometimes demanded, and it is demanded that the distribution (in the XZ plane) of the emitted light from the light emission surface be broader. On the other hand, in a small-sized planar light source device having a small display area for a cellular phone, portable information terminal or the like, high luminance or display quality level enhancement sometimes has priority, and the distribution (in the XZ plane) of the emitted light from the light emitting surface may be comparatively small. Therefore, as the light diffusion element 8, an element having an appropriate light diffusing characteristic is preferably used in accordance with a size of the display area of the planar light source device.

In the present invention, an element having anisotropy in the light diffusion property is preferably used as the light diffusion element, so that the total light ray transmittance of the light diffusion element is enhanced, the emitted light from the polarization separation element 6 can be efficiently diffused, and the luminance can be enhanced. For example, in the planar light source device in which a linear cold cathode tube is disposed as the primary light source 1 facing one end face of the light guide 3, in the light deflection element 4 for narrowing the view field, mainly the view field of the emitted light from the light emitting face of the light guide 3 is narrowed in the XZ plane. The light diffusion element has a purpose to diffuse the light of the above narrowed view field mainly in the XZ plane and to broaden the view field angle. However, when using the light diffusion element having an isotropic diffusing property, the light of the YZ plane whose view field is not narrowed is equally diffused by the light diffusion element, and therefore the drop of luminance is caused. Therefore, by the use of the light diffusion element having such an anisotropic diffusing property that the light diffusing property in the XZ plane is higher than that in the YZ plane, the light of the XZ plane whose view field is narrowed by the light deflection element 4 is strongly diffused, the diffusion of the light of the YZ plane whose view field is not narrowed can be weakened, the emitted light from the light deflection element 4 can be efficiently diffused, and the drop of the luminance can be minimized as much as possible.

The present invention will be described hereinafter concretely in accordance with examples and comparative example.

It is to be noted that measurements of characteristic values in the following examples and comparative example were performed as follows.

Measurement of Normal-Line Luminance and Luminance Full Width at Half Maximum of Planar Light Source Device A cold cathode tube was used as a primary light source, DC12V was applied to an inverter (HIU-742A manufactured by Harrison Co.) of a driving circuit to thereby light the cold cathode tube at high frequency. The normal-line luminance was obtained by dividing the surface of a planar light source device into 3×5 square portions each having four 20 mm sides, and taking an average of 15 luminance values in the normal-line direction of each square portion. The view field angle of the luminance meter was set to 0.1°, a measurement position was adjusted into a middle of a light emission surface of the planar light source device, and further adjustment was performed in such a manner as to rotate a rotational shaft of a goniometer. While rotating the rotational shaft at an interval of 10 from +90° to −90° in each direction, the luminance distribution (in the XZ plane, YZ plane) of the emitted light was measured with a luminance meter, and a peak luminance, and a full width at half maximum (spread angle of distribution of values which were ½ or more of the peak value) of luminance distribution (in the XZ and YZ planes) were obtained.

Measurement of Luminance Rise Ratio by Polarization Separation Element

A planar light source device in which any polarization separation element was not incorporated was prepared, and a liquid crystal display element 7 was disposed on the light emitting face of a planar light source device. In this state, an average of 15 luminance values in a normal-line direction was obtained by the above-described method. Next, a polarization separation element 6 was incorporated in the same planar light source device. At this time, a polarization transmission direction of the liquid crystal display element 7 on a light incident side was brought in parallel with a transmission polarization plane of the polarization separation element 6. In this state, an average of 15 luminance values in the normal-line direction was obtained in the above-described method. A ratio of a measured value in a case where the polarization separation element 6 is used with respect to that in another case where the polarization separation element 6 is not used is assumed as a luminance rise ratio by the polarization separation element 6.

Measurement of Average Inclination Angle (θa)

Surface roughness of a rough surface was measured at a driving speed of 0.03 nanosecond with a probe type surface roughness gauge (Surfcom 570A manufactured by Tokyo Seiki Co., Ltd.) using 010-2528 (1 μmR, 55° cone, diamond) as a probe according to ISO4287/1-1987. An average line was subtracted from a chart obtained by the measurement to thereby correct inclination, and the average inclination angle was calculated and obtained by the above equations (1) and (2).

COMPARATIVE EXAMPLE 1

A light guide whose one major surface was a mat-finished surface having an average inclination angle of 2.5° and whose other major surface was a mirror surface was prepared by injection molding using an acrylic resin (Acripet VH5#000 manufactured by Mitsubishi Rayon Co., Ltd.). The light guide had a wedge plate shape having a size of 216 mm×290 mm and having a thickness changing to 2.0 mm–0.7 mm along the side (short side) having a length of 216 mm. A prism layer was formed of an acrylic ultraviolet setting resin in which elongated prisms each having a prism apex angle of 100° were juxtaposed and arranged at a pitch of 50 μm in parallel with the short side of the light guide on the mirror surface side of the light guide. A cold cathode tube was disposed along one side end face (end face on the side having a thickness of 2.0 mm) corresponding to a side (long side) of the light guide having a length of 290 mm. The cold cathode tube was covered with a light source reflector (silver reflective film manufactured by Reikosha Co.). Furthermore, a light diffusion reflective film (E60 manufactured by Toray Industries, Inc.) was attached to the other side end face, and a reflective sheet (E60 manufactured by Toray Industries, Inc.) was disposed on the surface (back surface) of the elongated prism arrangement. The above-described constitution was incorporated in a frame member.

On the other hand, a prism sheet (light deflection element 4) in which an elongated prism formed surface was formed on one surface of a polyester film having a thickness of 125 μm was prepared using an acrylic ultraviolet ray setting resin having a refractive index of 1.5064. On the elongated prism formed surface, elongated prisms were substantially juxtaposed and arranged at a pitch of 56.5 μm, first and second prism faces constituting each elongated prism were both flat faces, and each angle (α, β) formed by the prism face with a normal line was 32.5°.

The obtained prism sheet was disposed on the light guide in such a manner that the elongated prism formed surface was directed on a light emitting face side of the light guide, a prism ridgeline was parallel to a light incident face of the light guide, and the first prism face was disposed on a primary light source side, to thereby obtain the planar light source device.

In the planar light source device, an emitted light luminance distribution (in an XZ plane) in a plane vertical to both the light incident face and the light emitting face, and an emitted light luminance distribution (in a YZ plane) in a plane parallel to the light incident face and vertical to the light emitting face were obtained, and an angle (full width at half maximum) having a luminance being ½ of a peak luminance was measured. Results are shown in Table 1.

A liquid crystal display element was disposed on the light emission surface of the planar light source device. At this time, a transmission axis of a polarization plate on an incident side of the liquid crystal display element was inclined by 45° with respect to the light incident face of the light guide. In this state, the whole surface of the liquid crystal display element was brought into a uniform display state, 15 values of normal-line luminance were measured by the above-described method, and averaged, to thereby obtain a luminance value A. On the other hand, a plurality of sheets each having a double refraction property and a predetermined thickness were stacked, while adjusting directionality of each sheet in such a manner that a refractive index difference between the adjacent sheets was large in a transmission polarization plane and small in a reflection polarization plane, to thereby prepared a polarization separation element. The polarization separation element was disposed between the light deflection element 4 and the liquid crystal display element 7 of the above-described planar light source device in such a manner that a transmission axis was parallel to that of a polarization plate on the incident side of the liquid crystal display element. In this state, the whole surface of the liquid crystal display element was uniformly brought into the same display state as that in a case where the luminance value A was obtained, 15 values of the normal-line luminance were measured and averaged in the above-described method, to thereby obtain a luminance value B. A luminance rise ratio B/A by the polarization separation element was calculated. Results are shown in Table 1.

EXAMPLE 1

A planar light source device was prepared in the same method as that of Comparative Example 1 except that the following was used as a light deflection element 4.

A prism sheet in which an elongated prism formed surface was formed on one surface of a polyester film having a thickness of 125 μm was prepared using an acrylic ultraviolet ray setting resin having a refractive index of 1.5064. On the elongated prism formed surface, elongated prisms were substantially juxtaposed and arranged at a pitch of 56.5 μm. One prism face (first prism face) constituting the elongated prism was a flat face having an angle (α) of 32.5° formed with a normal line. The other prism face (second prism face) comprised two convex curved faces: a convex curved face (inclination angle=56.60, β=33.8°) extending through an area of elongated prism height of 0 (a prism apex portion) to 21.4 μm from a prism apex portion and forming a part (vicinity of a portion having a curvature radius of 800 μm) of a non-circular arc sectional shape having a curvature radius of 400 μm on a long diameter and a curvature radius of 800 μm on a short diameter; and another convex curved face (inclination angle=59.0°) extending through another area of elongated prism height of 21.4 μm or more from the prism apex portion and forming a circular sectional shape having a curvature radius of 400 μm. A ratio (d/P) of a maximum distance (d) from a virtual flat plane of the second prism face of the prism sheet with respect to a pitch (P) of the elongated prisms was 1.03%.

As to the obtained planar light source device, the full width at half maxim of an emitted light luminance distribution in XZ and YZ planes, and a luminance rise ratio by the polarization separation element were measured in the same manner as in Comparative Example 1. Results are shown in Table 1.

EXAMPLE 2

A planar light source device was prepared in the same method as that of Comparative Example 1 except that the following was used as a light deflection element 4.

A prism sheet was prepared in the sane manner as in Example 1 except that a second prism face constituting the elongated prism comprised seven flat faces: a flat face (β=34.8°) having an inclination angle of 55.2° and extending through an area of elongated prism height of 0 (a prism apex portion) to 16 μm from a prism apex portion; and six flat faces extending through another area of the elongated prism height of 16 μm or more from a prism apex portion and each having inclination angles of 55.5°, 56.2°, 57.0°, 57.8°, 58.4° and 59.4°, respectively, form a side close to the prism apex portion and an equal width. A ratio (d/P) of a maximum distance (d) from a virtual flat plane of the second prism face of the prism sheet with respect to a pitch (P) of the elongated prisms was 1.10%.

As to the obtained planar light source device, the full width at half maximum of an emitted light luminance distribution in XZ and YZ planes, and a luminance rise ratio by the polarization separation element were measured in the same manner as in Comparative Example 1. Results are shown in Table 1.

EXAMPLE 3

A planar light source device was prepared in the same method as that of Comparative Example 1 except that the following was used as a light deflection element 4.

A prism sheet was prepared in the same manner as in Example 1 except that a second prism face constituting the elongated prism comprised two flat faces and one convex curved face: a flat face (β=33.6) having an inclination angle of 56.4° and extending through an area of elongated prism height of 0 (a prism apex portion) to 10.6 μm from a prism apex portion; another flat face having an inclination angle of 56.8° and extending through another area of elongated prism height of 10.6 to 21.3 μm from a prism apex portion; and a convex curved face (inclination angle 59.2°) of a circular arc sectional shape having a curvature radius of 400 μm extending through still another area of elongated prism height of 21.3 μm or more from the prism apex portion. A ratio (d/P) of a maximum distance (d) from a virtual flat plane of the second prism face of the prism sheet with respect to a pitch (P) of the elongated prisms was 1.03%.

As to the obtained planar light source device, the full width at half maximum of an emitted light luminance distribution in XZ and YZ planes, and a luminance rise ratio by the polarization separation element were measured in the same manner as in Comparative Example 1. Results are shown in Table 1.

EXAMPLE 4

A planar light source device was prepared in the same method as that of Comparative Example 1 except that the following was used as a light deflection element 4, and an elongated prism pitch thereof was set to 50 μm.

A prism sheet was prepared in the same manner as in Example 1 except that each of first and second prism faces constituting the elongated prism comprised one convex curved face (α=32.7°, β=32.7°, inclination angle=57.3°) of a circular arc sectional shape having a curvature radius of 250 μm. A ratio (d/P) of a maximum distance (d) from a virtual flat plane of the second prism face of the prism sheet with respect to a pitch (P) of the elongated prisms was 2.14%.

As to the obtained planar light source device, the full width at half maximum of an emitted light luminance distribution in XZ and YZ planes, and a luminance rise ratio by the polarization separation element were measured in the same manner as in Comparative Example 1. Results are shown in Table 1.

EXAMPLE 5

A planar light source device was prepared in the same method as that of Comparative Example 1 except that the following was used as a light deflection element 4, and an elongated prism pitch thereof was set to 50 μm.

A prism sheet was prepared in the same manner as in Example 1 except that each of first and second prism faces constituting the elongated prism comprised one convex curved face (α=32.7°, β=32.7°, inclination angle=57.3°) of a circular arc sectional shape having a curvature radius of 425 μm. A ratio (d/P) of a maximum distance (d) from a virtual flat plane of the second prism face of the prism sheet with respect to a pitch (P) of the elongated prisms was 1.26%.

As to the obtained planar light source device, the full width at half maximum of an emitted light luminance distribution in XZ and YZ planes, and a luminance rise ratio by the polarization separation element were measured in the same manner as in Comparative Example 1. Results are shown in Table 1.

EXAMPLE 6

A light guide was prepared by injection molding using an acrylic resin (Acripet VH5#000 manufactured by Mitsubishi Rayon Co., Ltd.). The light guide had a wedge plate shape having a size of 40 mm×50 mm and having a thickness changing to 0.8 mm–0.6 mm along the side (long side) having a length of 50 mm. A corner portion positioned between one side end face (end face on the side having a thickness of 0.8 mm) corresponding to the side (short side) of the light guide having a length of 40 mm and the long side of the light guide was cut, to thereby form a light incident face. A rough surface having an average inclination angle of 2.5° was formed on the light emitting face of the light guide. An LED (NSCW215R manufactured by Nidia Kagaku Co.) was disposed in close contact with the light incident face. Furthermore, a light diffusion reflective film (E60 manufactured by Toray Industries, Inc.) was attached to the other side end faces, and a reflective sheet (E60 manufactured by Toray Industries, Inc.) was disposed on the surface (back surface) of the elongated prism arrangement. The above-described constitution was incorporated in a frame member.

On the other hand, a prism sheet in which elongated prisms were formed on one surface of a polyester film having a thickness of 125 μm was prepared using an acrylic ultraviolet ray setting resin having a refractive index of 1.5064. Elongated prisms had the same shapes of first and second prism faces as those of Example 2 and a pitch of 56.5 μm and were formed into concentric shapes centering on one corner of the prism sheet.

The obtained prism sheet was disposed in such a manner that a center of a concentric circular arc of the formed elongated prisms fell on a center of a light emission face of the primary light source, and the elongated prism formed surface was directed on a light emitting face side of the light guide, to thereby obtain the planar light source device.

As to the obtained planar light source device, the full width at half maximum of an emitted light luminance distribution in XZ and YZ planes, and a luminance rise ratio by a polarization separation element were measured in the same manner as in Comparative Example 1. Results are shown in Table 1. Additionally, during measurement of the luminance rise ratio, a normal-line luminance was measured in a state in which a transmission axis of a polarization plate on a light incident side of a liquid crystal display element was vertical to the light guide light emitting face, to thereby obtain a luminance value A. A normal-line luminance was measured in a state in which the polarization separation element was disposed between a light deflection element and liquid crystal display element of the planar light source device in such a manner that a transmission axis was parallel to that of the polarization plate on the light incident side of the liquid crystal display element, to thereby obtain a luminance value B.

TABLE 1

|  | XZ plane luminance full width at half maximum | YZ plane luminance full width at half maximum | Luminance rise ratio (B/A) |
| --- | --- | --- | --- |
| Comparative Example 1 | 27.5° | 40.2° | 1.38 |
| Example 1 | 14.1° | 40.2° | 1.46 |
| Example 2 | 14.5° | 40.2° | 1.44 |
| Example 3 | 13.9° | 40.2° | 1.47 |
| Example 4 | 21.2° | 40.2° | 1.42 |
| Example 5 | 15.3° | 40.2° | 1.45 |
| Example 6 | 14.5° | 16.4° | 1.55 |

INDUSTRIAL APPLICABILITY

As described above, according to the present invention, a distribution is constituted in such a manner that light entering a polarization separation element is condensed in a normal-line direction of the polarization separation element, accordingly a polarization separation ability of the polarization separation element is enhanced, and there can be provided a planar light source device having a remarkably high luminance based on a specific polarization component. Such a planar light source device is used in combination with a display device using light of the specific polarization component, such as a liquid crystal display device, so that display having a remarkably high luminance at low power consumption can be realized.

The invention claimed is:

1. A planar light source device comprising:
   a primary light source;
   a light guide leading light emitted from the primary light source, and having a light incident face to which the light emitted from the primary light source comes in, and a light emitting face from which the light goes out;
   a light deflection element disposed adjacent to the light emitting face of the light guide; and
   a polarization separation element disposed on the side of a light outgoing surface of the light deflection element, and having a function of transmitting one of polarization components of an incident light and reflecting the other of the polarization components, wherein a full width at half maximum of a luminance angular distribution of light incident upon the polarization separation element in a direction parallel to a travel direction of the light in the light guide is 25° or less.

2. The planar light source device according to claim 1, wherein the full width at half maximum of the luminance angular distribution of light incident upon the polarization separation element in a direction vertical to the travel direction of the light in the light guide is 50° or less.

3. The planar light source device according to claim 1, wherein an average value of the full width at half maximum of the luminance annular distribution of light incident upon the polarization separation element in directions vertical and parallel to the travel direction of the light in the light guide is 33° or less.

4. The planar light source device according to claim 1, wherein the light deflection element has a light incoming surface positioned facing the light emitting face of the light guide and a light outgoing surface on the opposite side, and a plurality of elongated prisms extending substantially in parallel with one another are formed at least on the light incoming surface.

5. The planar light source device according to claim 1, wherein the primary light source comprises a spotlight source, the light deflection element has a light incoming surface positioned facing the light emitting face of the light guide and a light outgoing surface on the opposite side, and a plurality of substantially arc-shape elongated prisms surrounding the primary light source are juxtaposed and formed at least on the light incoming surface.

6. The planar light source device according to claim 4, wherein each of the elongated prisms of the light deflection element comprises two prism faces, and at least one of the prism faces is a face other than a single flat face.

7. The planar light source device according to claim 6, wherein at least one of the prism faces includes at least one convex curved face.

8. The planar light source device according to claim 7, wherein at least one of the prism faces comprises at least one convex curved face, and at least one flat face, an inclination angle of the convex curved face or the flat face positioned on the side closer to the light outgoing surface is larger, and a difference between the inclination angle of the convex curved face or the flat face closest to the light outgoing surface and that of the flat face or the convex curved face most distant from the light outgoing surface is 15° or less.

9. The planar light source device according to claim 7, wherein at least one of the prism faces comprises at least two convex curved faces having mutually different inclination angles, an inclination angle of the convex curved face positioned on the side closer to the light outgoing surface is larger, and a difference between the inclination angle of the convex curved face closest to the light outgoing surface and that of the convex curved face most distant from the light outgoing surface is 15° or less.

10. The planar light source device according to claim 6, wherein at least one of the prism faces comprises at least two flat faces having mutually different inclination angles, an inclination angle of any one of the flat faces positioned on the side closer to the light outgoing surface is larger, and a difference between the inclination angle of a flat face closest to the light outgoing surface and that of the flat face most distant from the light outgoing surface is 15° or less.

11. The planar light source device according to claim 7, wherein a ratio (r/P) of a curvature radius (r) of the convex curved face to a pitch (P) of the elongated prism is in a range of 2 to 50.

12. The planar light source device according to claim 8, wherein at least two flat faces and/or convex curved faces are formed in a region having a height h from a prism apex portion, and h/H is 60% or less assuming that the height of the elongated prism is H.

13. The planar light source device according to claim 8, wherein a ratio of a maximum distance (d) between the flat face and/or the convex curved face, and a virtual plane connecting a prism apex portion to a prism bottom portion with respect to the pitch (P) of the elongated prism is in a range of 0.05 to 5%.

14. The planar light source device according to claim 4, wherein an apex angle of the elongated prism is in a range of 35 to 80°.

15. The planar light source device according to claim 4, wherein one distributing angle α of an apex angle of the elongated prism is 40° or less, and the other distributing angle β of the apex angle is in a range of 25 to 50°.

16. The planar light source device according to claim 4, wherein one distributing angle α of an apex angle of the elongated prism is different from the other distributing angle β.

17. The planar light source device according to claim 4, wherein each of the elongated prisms of the light deflection element comprises two prism faces, one of the prism faces comprises a flat face and/or a convex curved face, and the other prism face is a substantially flat face.

18. The planar light source device according to claim 1, wherein a plurality of elongated lenses extending in a direction substantially vertical to the light incident face of the light guide and arranged substantially in parallel with one another in a plane along the light emitting face are formed on one of the light emitting face of the light guide and a back surface on the opposite side thereof.

19. The planar light source device according to claim 1, wherein the polarization separation element comprises a plurality of sheets each having double refractive properties, and a refractive index difference between the adjacent sheets in a polarization direction of a reflected polarization component is smaller than that in a polarization direction of a transmitted polarization component.

20. The planar light source device according to claim 1, further comprising:
a light diffusion element disposed on the side of a light emitting surface of the polarization separation element.

21. The planar light source device according to claim 20, wherein the light diffusion element has a full width at half maximum of an emitted light luminous angular distribution with incidence of parallel light in a range of 1 to 13°.

22. The planar light source device according to claim 20, wherein a haze value of the light diffusion element is in a range of 8 to 82%.

* * * * *